March 17, 1953  E. C. McRAE  2,631,515

POWER LIFT MECHANISM FOR TRACTORS

Filed May 6, 1947  4 Sheets-Sheet 1

E. C. McRAE
*INVENTOR.*

BY J. R. Faulkner
T. H. Oster

ATTORNEYS.

March 17, 1953 E. C. McRAE 2,631,515
POWER LIFT MECHANISM FOR TRACTORS
Filed May 6, 1947 4 Sheets-Sheet 3

E. C. McRAE
INVENTOR.

BY J. R. Faulkner
T. H. Ostin

ATTORNEYS.

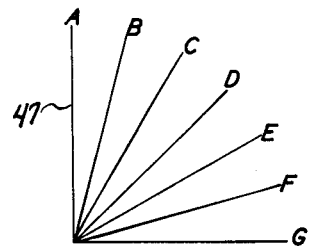
Fig. 7
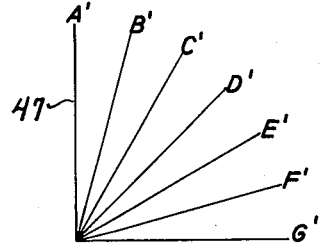
Fig. 9
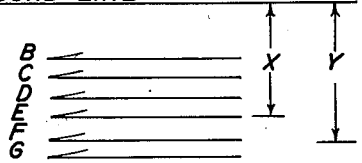
Fig. 8    Fig. 10

Patented Mar. 17, 1953

2,631,515

UNITED STATES PATENT OFFICE 2,631,515

POWER LIFT MECHANISM FOR TRACTORS

Edwin C. McRae, Dearborn, Mich., assignor to Ford Motor Company, Dearborn, Mich., a corporation of Delaware Application May 6, 1947, Serial No. 746,331

11 Claims. (Cl. 97—50)

This invention relates generally to tractors and more particularly to improvements in the control of tractors having hydraulic power operated means for raising and lowering implements attached to the tractor.

Reference is made to the patent to Ferguson 2,118,180, which discloses a tractor having hydraulic power operated mechanism for automatically controlling the depth of an implement attached to the tractor in accordance with the draft of the implement. In this general type of tractor the implement, such as a plow, is connected to the tractor by means of upper and lower links, the upper link being in compression and operating against a heavy coil spring to vary the position of an actuating lever connected to a valve. The valve controls the operation of a pump and a ram cylinder which operate through suitable linkage to raise and lower the links to which the implement is attached. A manual control arm connected to the actuating lever controls the depth of cut, and the implement is automatically maintained at this depth by the draft control mechanism.

When a tractor of the type briefly described above is used with implements other than a plow the draft control mechanism does not operate satisfactorily, due to the fact that a relatively heavy compression spring must be used to provide the proper draft control when plowing at normal depth and with normal soil conditions, which spring is too heavy to deflect for light draft loads. Furthermore, the links to which the plow is attached to the tractor can be held only at their lowermost or uppermost position so that the draft control must be utilized to regulate depth of the implement. When there is insufficient draft to operate the draft control mechanism, the control arm must be actuated to raise the links and drawbar to their uppermost positions. Conversely, the control arm must be actuated to exhaust the hydraulic lift mechanism to cause the links and drawbar to be lowered to their lowermost position. In many agricultural operations this is a serious disadvantage and prevents the tractor from being used with maximum effectiveness and efficiency.

An object of the invention is, therefore, to provide a correlated height and draft control mechanism for a tractor of this type which will enable the implement attachment means to be held at any desired height under normal or light draft conditions, yet in which the draft control mechanism will automatically overrule the height control mechanism in the event the draft increases beyond a predetermined amount or an obstacle is encountered. This is accomplished by providing a pair of adjacent movable fulcrums for the valve actuating lever, one movable in response to the draft of the implement and the other movable in response to the height of the implement. The arrangement is such that under most operating conditions the height responsive fulcrum is the effective fulcrum for the valve actuating lever with the draft responsive fulcrum automatically being shifted into overriding and controlling position when the draft increases beyond a predetermined amount so as to then become the effective fulcrum for the valve actuating lever.

The construction of the present invention operates to advantage with various types of agricultural equipment, and is also valuable in shallow draft plowing in light soil where the draft control mechanism is inoperative because the draft is insufficient to compress the relatively heavy spring necessarily used with the compression link. In this type of plowing with the present invention it is only necessary to regulate the control arm to hold the plow at the required depth, since the mechanism operates automatically to achieve this result. When using the tractor with a mower, it is now possible to hold the mower at any intermediate height. This is particularly advantageous in certain types of mowing, such, as for example, the cutting off of weeds at a height just above the height of the crop being grown. It also permits more effective, safer operation in drawbar pulling, since the pulling can be done at the proper and safest height, whereas with conventional tractors this type of drawbar pull is usually done with the drawbar at its uppermost position to prevent the cable from becoming mired on the ground. In the upper position the line of force is well above the center of gravity of the tractor and may under some circumstances cause the front end of the tractor to raise up. The present arrangement is also more effective when pulling trailers of the two-wheel type, since the drawbar can be set and held at any predetermined height sufficient to lift the trailer from its supporting legs. Heretofore it has been necessary to support such a trailer by means of an upper compression link, but this is now not necessary.

The foregoing examples are mentioned as indicating the advantages accruing from the use of the construction of the present invention with particular implements and under certain conditions, and it will be understood that there are numerous other implements whose operation is simplified or improved by the use of this invention.

A further object of the invention is to provide the draft control mechanism and/or the height control mechanism with spring urged means strong enough to overrule the valve return spring but yieldable to permit instantaneous adjustment of the hand control lever upwardly.

Still another object of the invention is to provide a tractor having a hydraulic power unit for raising an implement in which the operation of the hydraulic unit is effectively controlled by means of separate intake and exhaust valves.

Other objects and advantages of the invention will be made more apparent as this description proceeds, particularly when considered in connection with the accompanying drawings, wherein:

Figure 7 is a diagrammatic chart showing a series of positions of the quadrant hand lever in draft control.

Figure 8 is a diagrammatic chart showing the positions of a plow in draft control corresponding to the positions of the quadrant hand lever shown in Figure 7.

Figure 9 is a diagrammatic chart showing a series of positions of the quadrant hand lever in height control, the positions being the same as those in Figure 7.

Figure 10 is a diagrammatic chart showing the positions of a plow in height control corresponding to the positions of the quadrant hand lever shown in Figure 9.

Figure 1:
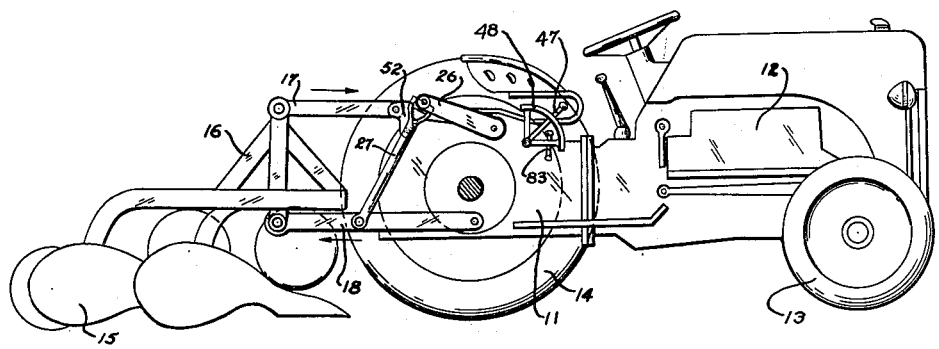
Figure 1 is a side elevational view of a tractor embodying the present invention and having a plow attached thereto.

Referring now more particularly to the drawings, the reference character 11 indicates the rear portion of the tractor casing, 12 the engine thereof, and 13 and 14 the front and rear wheels respectively. The implement shown in Figure 1 is a plow 15, which has an A-frame 16 connected to the tractor by pivotally mounted upper and lower links 17 and 18 respectively. Other implements may, of course, be connected to the links either directly or by means of a conventional drawbar supported between the rearward ends of the lower links 18.

A piston 19 reciprocates within a cylinder 21 carried by the tractor casing 11 and is connected by means of a connecting rod 22 to a crank arm 23 mounted upon the shaft 24. A pair of lift arms 26 are mounted upon the shaft 24 and are connected by lift rods 27 to the lower links 18.

Figure 3:
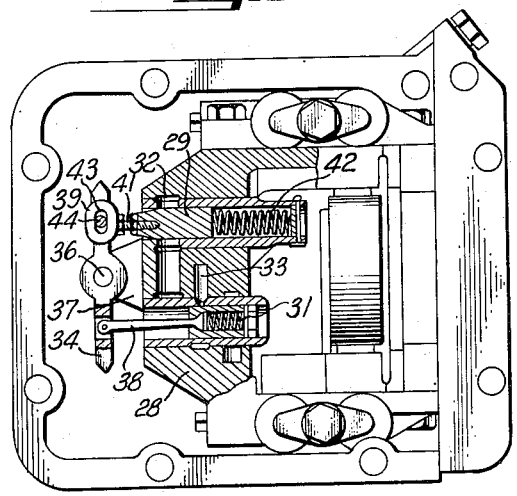
Figure 3 is a cross sectional view taken substantially on the plane indicated by the line 3—3 of Figure 2.

A fluid pump 28 of the double yoke type is also mounted upon the casing 11 and is continuously driven through suitable connections (not shown) by the tractor engine 12. As best shown in Figure 3, intake and exhaust valves 29 and 31 respectively, are slideably mounted in the housing of the pump 28. The intake valve 29 controls a conduit 32 leading from the sump to the suction side of the pump while the exhaust valve 31 controls an exhaust conduit 33 adapted to connect the pump and cylinder to exhaust. Control of the separate intake and exhaust valves is effected through a rock arm 34 centrally pivoted at 36 upon a flange 37 extending outwardly from the pump housing. One end of the rock arm 34 is connected by means of a rod 38 to the exhaust valve 31, while the opposite end of the arm is formed with an enlargement 39 providing a bearing for engagement by an adjustable stud 41 mounted in the end of the intake valve 29. A coil spring 42 maintains the stud 41 carried by the intake valve 29 in engagement with the enlargement 39 of the rock arm, and constantly tends to rotate the arm in a counterclockwise direction. An elongated slot 43 is formed in the enlargement 39 of the rock arm and receives the lower end of an actuating lever 44.

The upper end of the actuating lever 33 is pivotally connected to an eccentric portion 45 of a shaft 46 journaled in the tractor casing. The shaft 46 is rotated by a hand lever 47 to effect a fore and aft movement of the upper end of the actuating lever 44. The upper end of the hand lever 44 moves in a quadrant 48 and the adjustable stop 49 can be set to give the desired maximum depth of cut. Movement of the hand lever 47 in the direction of the arrow 50, Figure 4, rotates the actuating lever 44 in a clockwise direction around the fulcrum 51 (described more in detail hereinafter), and the lower end of the actuating lever 44 swings the rock arm 34 in a counterclockwise direction as seen in Figure 3 to close the intake valve 29 and open the exhaust valve 31, permitting the implement to drop under its own weight.

Figure 4:
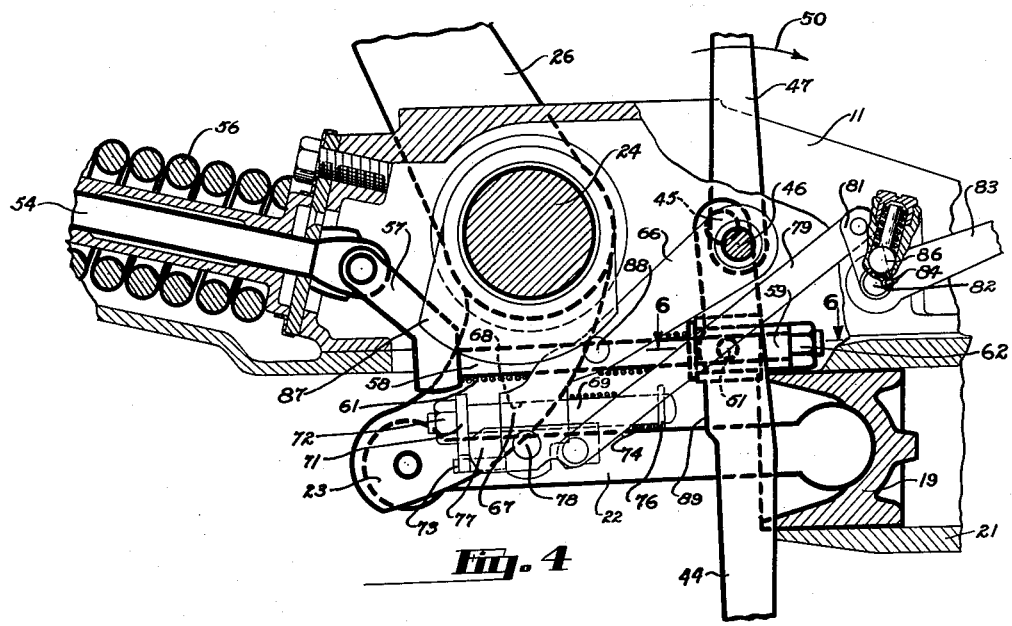
Figure 4 is a semi-diagrammatical side elevational view, partly in section, similar to a portion of Figure 2 but illustrating the height control mechansm in its "off" position. In this view, the various parts operative in connection with the draft control mechanism are shown in heavy lines with the other parts in relatively light lines.
Figure 6:
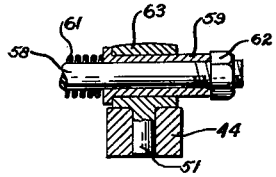
Figure 6 is a fragmentary cross sectional view taken substantially on the plane indicated by the line 6—6 of Figure 4.

The upper end of the actuating lever 44 is der compression due to the draft on the plow, is connected at its forward end to a bellcrank lever 52 pivoted at 53 to the tractor casing and also to a rod 54 on which is mounted a heavy compression spring 56. The forward end of the rod 54 is pivotally connected to a link 57 which supports a forwardly extending rod 58. As best seen in Figures 4 and 6, a bushing 59 is slideably mounted upon the rod 58 and urged by a spring 61 toward a stop nut 62. A swivel member 63 is rotatably mounted upon the bushing 59 and the fulcrum pin 51 projects therefrom and pivotally engages an intermediate portion of the actuating lever 44.

When the plow is lowered to the ground by the movement of the hand lever 47 in the direction of the arrow 50, as described above, the draft then imposed upon the plow is effective through the upper compression link 17 to compress the coil spring 56 and to cause the rod 54, link 57, and rod 58 to move to the right. Since the coil spring 61 on the rod 58 is stronger than the return spring 42 associated with the intake valve 29, the fulcrum 51 of the actuating lever is moved to the right, swinging the actuating lever 44 about the shaft 46 and rotating the rock arm 34 in a clockwise direction to move the exhaust valve 31 toward its closed position. When the implement reaches the desired depth, the exhaust valve is closed.

It will be noted that when the hand lever 47 is raised the spring 61 may be compressed and the lever 44 moved rearwardly, thus permitting instantaneous adjustment of the hand lever even though the draft of the implement does not permit the draft control link 57 and rod 58 to be immediately shifted. Thus, at the end of a furrow the plow may be lifted without bringing the tractor to a complete stop to relieve the draft.

Figure 2:
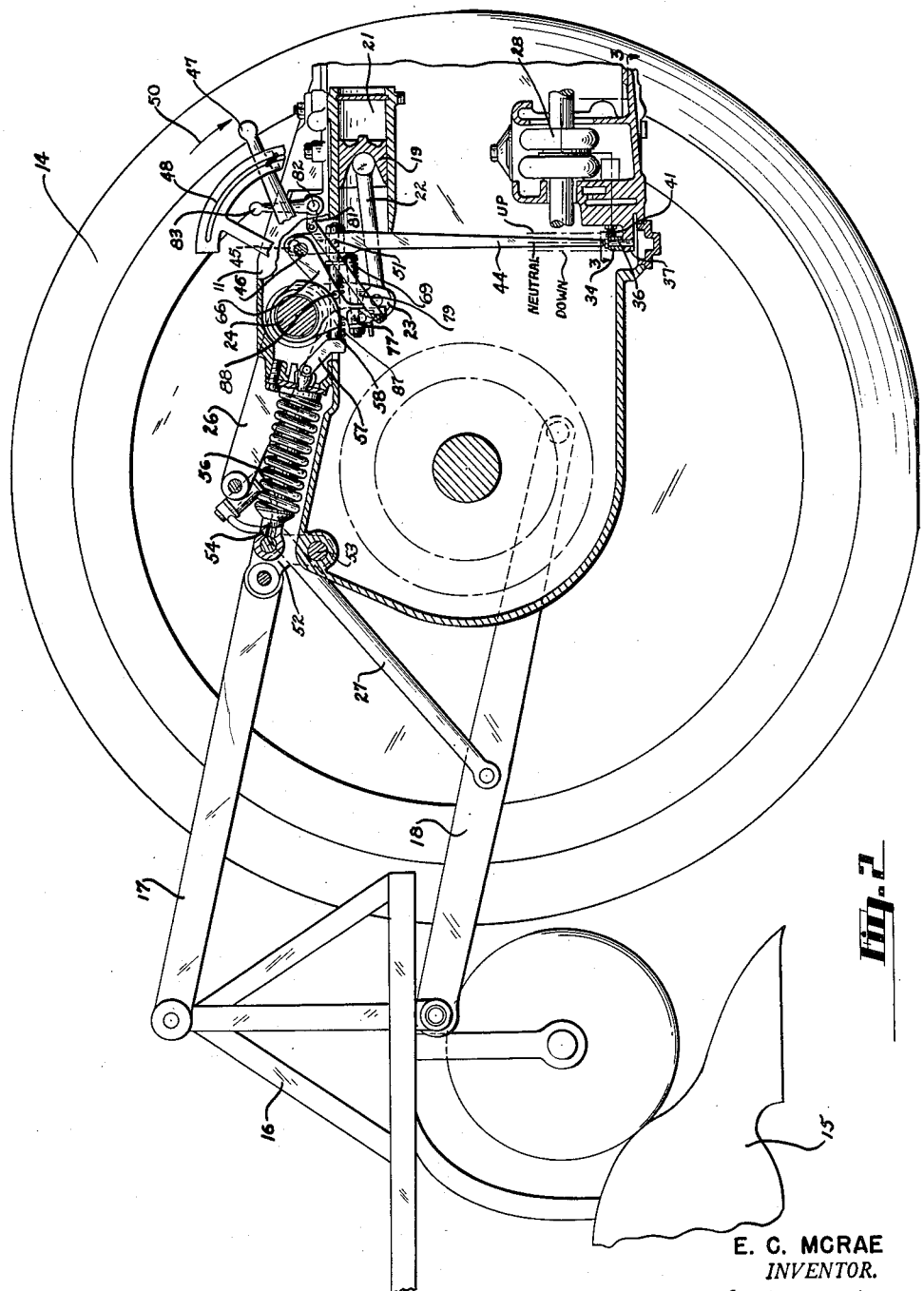
Figure 2 is an enlarged longitudinal sectional view, partly in elevation, of the rearward portion of the tractor, with the implement attachment means in a partially raised position.

The draft control mechanism described above is effective to automatically maintain a constant draft upon the plow and thus controls the working depth thereof. When, however, it is desired to plow at a shallow depth such that the draft is insufficient to compress the spring 56, or when it is desired to use the tractor with other implements including those connected to the tractor by means of a drawbar 65 carried by the lower links 18 (Figure 2), it is impossible with the draft control mechanism alone to hold the links or the drawbar at an intermediate position. Only two positions are possible, namely, the uppermost position and the lowermost position. As previously mentioned, it is highly desirable with certain implements and under certain conditions to be able to set and hold the drawbar and the implement attached thereto at selected intermediate heights. This can be accomplished by the height control mechanism now to be described.

A rearwardly extending arm 66 is pivotally mounted upon the shaft 47 concentrically with the hand lever 48. The arm 66 is formed with an enlarged downwardly extending flange 67 which is provided with a bore 68 therethrough slideably supporting a plunger 69. A plate 71 is secured to the rearward end of the plunger 69 by means of a nut 72. The plate 71 and the plunger 69 are prevented from turning during their reciprocation relative to the arm 66 by means of a pin 73 extending rearwardly from the lower portion of the flange 67 of the arm and slideably engaging a notch formed in the plate 71. A spring 74 encircles the plunger between the flange 67 and an enlargement 76 integrally formed at the end of the plunger, and constantly tends to urge the plunger in a forward direction.

A U-shaped cam member 77 straddles the flange 67 of the arm 66 and is pivotally connected thereto by the pin 78. The cam 77 is connected by means of a link 79 to one arm 81 of a bellcrank, the other arm 82 of which is journaled in the tractor casing. A manual control lever 83 is pinned to the arm 82 of the bellcrank and is effective upon operation to swing the cam 77 between the positions shown in Figures 4 and 5. Detents 84 are formed in the arm 82 of the bellcrank and are engaged by a spring urged ball 86 to hold the lever in its indexed positions.

Pivotal movement of the arm 66 and the plunger 69 carried thereby is controlled by means of a cam 87 mounted upon the shaft 24, the latter being the shaft carrying the lift arms 26. A cam roller or follower 88 is mounted upon the arm 66 and is arranged to be engaged by the cam 87.

The operation of the height control mechanism is as follows. When the draft control mechanism is operative, as in normal plowing operations, the height control mechanism is rendered inoperative by swinging the manual control lever 83 forwardly and downwardly to the position shown in Figure 4. It will be noted that this movement of the lever 83 is effective, through the bellcrank 82—81 and the link 79 to rotate the cam 77 in a counterclockwise direction. The end of the cam bears against the plate 71 carried by the plunger 69 and the latter is consequently moved to the left in the arm 66 against the action of the coil spring 74. This withdraws the end 76 of the plunger from its normal position adjacent the bearing surface 89 of the actuating lever 44. With the parts in this position, the draft control mechanism and the parts operative therewith, as indicated in heavy lines in Figure 4, are free to operate independently of the height control mechanism.

Figure 5:
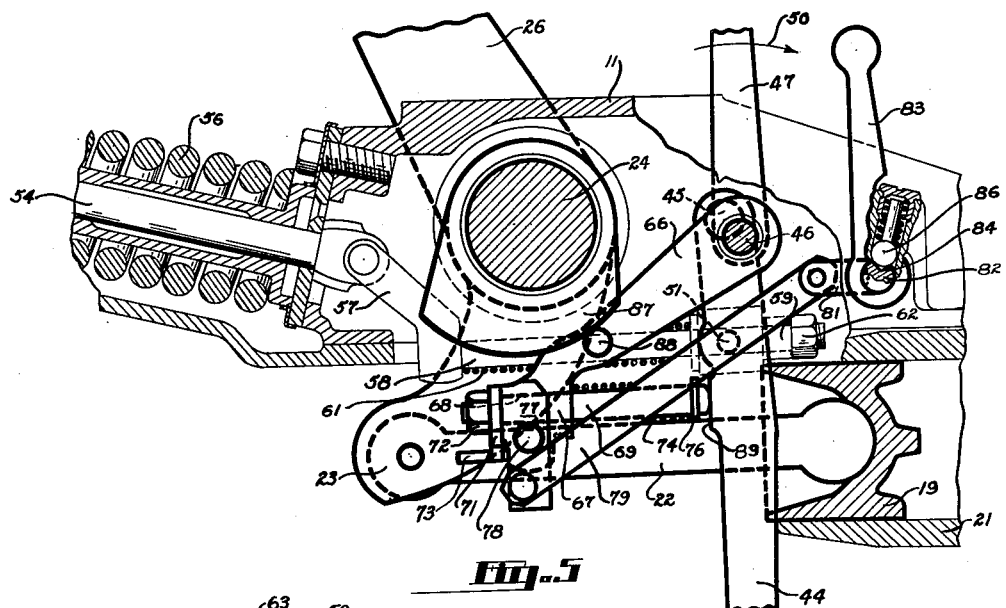
Figure 5 is a semi-diagrammatical view similar to Figure 4 but illustrating the height control mechanism in its operative position, and showing the various parts which are operative in connection with the height control mechanism in heavy lines, the other parts being shown in relatively light lines.

When it is desired to use the height control mechanism the manual control lever 83 is swung upwardly to the position shown in Figure 5. It will be noted that in this view the various parts associated with the height control mechanism and operative therewith are shown in heavy lines, while the other parts are shown in relatively light lines. The cam 77 is now moved to its upright position, permitting the plunger 69 to be moved under the action of the spring 74 to a position such that the plate 71 carried by the plunger abuts the rearward edge of the flange 67 of the arm 66. In this position the forward end 76 of the plunger is adjacent the bearing surface 89 formed on the actuating lever 44 and serves as a fulcrum for the lever.

Assuming now that it is desired to move the lift arms 26 and the lower links 18 connected thereto from the uppermost position shown in Figure 5 to a lower and intermediate position, the hand lever 47 is moved in the direction of the arrow 50, the amount of movement being dependent upon the desired position of the lower links and the drawbar. This shifts the upper end of the actuating lever 44 forwardly and, with the end 76 of plunger 69 forming a fulcrum, the actuating lever 44 swings in a clockwise direction to open the exhaust valve 31 and to permit the lower links 18 and the drawbar 65 to drop under their own weight. As the drawbar is lowered the lift arms 26 and the shaft 24 rotate in a counterclockwise direction and the cam 87 engages the cam follower 88 upon the arm 66 to rotate the latter in a counterclockwise direction about its pivotal connection with the shaft 46. Inasmuch as the plunger 69 is carried by the arm 66, the plunger is moved to the right and swings the actuating lever 44 in a counterclockwise direction about its upper pivotal connection with the eccentric 45. This return movement of the lever 44 operates the rock arm 34 to close the exhaust valve 31 and arrest the lowering movement of the links and drawbar after they have reached a predetermined height.

It will be noted that there is a definite relationship between the position of the hand lever 47 and the height at which the lower links 18 and the drawbar 45 are positioned. For a given movement of the hand lever 47 a definite movement of the cam 87 carried by the lift arm shaft is necessary to shift the actuating lever 44 and return the intake and exhaust valves to their neutral positions. During operation the drawbar is automatically maintained at the predetermined height. Any leakage in the hydraulic system which causes the links 18 and the drawbar to be dropped below their predetermined height is effective through the cam 87 and the cam follower 88 to rotate the arm 66 and plunger 69 in a counterclockwise direction, shifting the actuating lever 44 and opening the intake valve 29 long enough to return the links and drawbar to their previous height. At any time the height of the drawbar can be adjusted in either direction simply by shifting the position of the hand lever 47.

Even though the height control mechanism is in its operative position and the end 76 of the plunger 69 is in engagement with the bearing surface 89 on the actuating lever 44, the hand lever 47 can be instantaneously moved upwardly by collapsing the spring 74 on the plunger 69. Subsequent movement of the lift arm shaft 24 and the cam 87 returns the parts to their normal positions. The spring 74 is, of course, made stronger than the intake valve spring 42 so as to overrule the latter.

Under certain circumstances the height control mechanism may be overruled by operation of the draft control mechanism. For example, with a spring tooth harrow the draft will normally be insufficient to operate the draft control mechanism and the height of the harrow will be determined by the height control mechanism, as hereinbefore described. If an obstacle is encountered, however, such as a rock or a root, the increase in draft will compress the draft control spring 56 and move the link 57 and rod 58 forwardly to swing the actuating lever 44 and open the intake valve 29. As a result the harrow is lifted from the ground and damage thereto is prevented. Similarly, in shallow draft plowing the draft control mechanism may take over operation of the hydraulic lift mechanism from the height control mechanism when an obstacle is encountered. Thus, the draft control mechanism and the height control mechanism cooperate in making possible the efficient operation of implements under all conditions.

With the height control mechanism described above, the attachment links and the drawbar carried thereby can be set and maintained at any desired height between the lowermost and uppermost positions, and a construction is provided which has definite advantages when used in shallow draft plowing, with harrows and the like, and also when used with various implements normally connected to a drawbar.

Reference is now made to the charts shown in Figures 7, 8, 9 and 10 which illustrate graphically the relationship between the position of the hand lever 47 in its quadrant and the position of the plow 15 in both draft control and height control. As shown in Figures 7 and 8, in draft control the uppermost position A of the hand lever 47 corresponds to the position A of the plow at its maximum height above the ground level. As previously described, the initial downward movement of the hand lever, from the position A to the position B for example, closes the intake valve 29 and opens the exhaust valve 31 permitting the plow 15 to fall under its own weight to ground level and to assume a position of light draft and shallow depth, as shown at B. Further downward movement of the hand lever from the position B to successive positions C, D, E, F, and G is effective to vary the working depth of the plow as shown by the correspondingly lettered plow positions. Figure 10 illustrates plow positions A', B', C', D', E', F' and G' obtained with height control with the height control lever 83 thrown in (Figure 5) and the hand lever 47 in the correspondingly lettered positions in Figure 9, identical to the positions illustrating draft control in Figure 7. As hereinbefore described more in detail, each movement of the hand lever 47 results in a proportionate movement of the plow.

It will readily be apparent that a definite and important correlation exists between hand lever and plow positions in draft and height control. It will be seen from an examination of the chart that for any hand lever position other than its uppermost and lowermost positions A and G respectively, the plow depth is greater and the draft thus also greater in draft control than in height control. For example, with the hand lever in position E' in height control (Figure 9), the plow is held at a depth X' (Figure 10), while the same hand lever position E in draft control (Figure 7) results in positioning the plow at a depth X (Figure 8) which is greater than the depth X'. Similarly at position F' the plow is held at a depth Y' in height control, but at a greater depth Y in draft control. Thus, when operating in height control the draft control normally does not interfere since for any intermediate hand lever position the draft of the plow is insufficient to cause the draft control mechanism to come into operation. This is accomplished without in any way disconnecting the draft control mechanism, so that it is immediately available to overrule the height control mechanism and raise the plow if an obstacle is encountered or the draft is suddenly increased a predetermined amount. In addition it is ready for instantaneous operation in the event the height control lever is thrown out by the operator. From the foregoing it will be apparent that a single manually operated control lever 47 is arranged to control both draft control and height control operation of the implement and that the two controls are so related as to cooperate with each other to provide the most advantageous type of operation under all conditions.

The drawings and specification of this application disclose the tractor mechanism embodied in tractors now being commercially manufactured by the assignee. Part of this structure forms the invention of this application, and part forms the invention of the copending application of Dale Roeder, Serial No. 746,255, filed concurrently herewith. The invention of this application resides in the combination of height responsive mechanism, draft responsive mechanism and power actuated lifting mechanism for controlling the height of an implement carried by the tractor. Specifically, the height responsive mechanism includes arm 66 and its integral downwardly extending flange 67, plunger 69 slidably supported in the flange and forming the height responsive fulcrum for the valve actuating lever 44, plate 71 and nut 72 and spring 74 carried by the plunger, cam 87 mounted upon the lift shaft 24, and cam follower 88 carried on the arm 66 and engaged by the cam 87. The draft responsive mechanism includes rod 54 actuated by the upper link 17, compression spring 56, link 57 and rod 58 connected thereto, bushing 59 and swivel member 63, pin 51 forming the draft responsive fulcrum for the valve actuating lever 44, and spring 61 and stop nut 62. The power actuated lifting mechanism includes lift arms 26, lift shaft 24, crank arm 23, connecting rod 22, lift cylinder 21 and piston 19, intake and exhaust valves 29 and 31, valve actuating lever 44 and the manually operated lever 47. This combined structure is so arranged that the height responsive mechanism provides the effective fulcrum for the valve actuating lever during most operating conditions with the draft responsive mechanism automatically overriding the height responsive mechanism when the draft increases beyond a predetermined amount to then provide a draft responsive fulcrum for the valve actuating lever.

The mechanism for selectively retracting the height responsive fulcrum from its engagement with the valve actuating lever to permit the tractor to operate in draft control only does not constitute part of the invention of this application. Specifically, this mechanism includes the U-shaped cam member 77 and its pivot pin 78, link 79, bellcrank 81—82, manual control arm 83 detents 84 and detent ball 86, and guide pin 71. This latter portion of the tractor structure, and its combination with the height and draft responsive mechanisms, forms the invention of the said copending application of Dale Roeder, Serial No. 746,255.

It will be understood that the invention is not to be limited to the exact construction shown and described, but that various changes and modifications may be made without departing from the spirit and scope of the invention, as defined in the appended claims.

What is claimed is:

1. In a tractor, a pivotally mounted member adapted to be attached to an implement, a shaft rotatably supported upon said tractor, linkage connecting said member to said shaft to raise and lower the member upon rotation of the shaft, a hydraulic power unit for rotating said shaft, valve means for controlling the operation of said hydraulic power unit, a lever having one end connected to said valve means, pivotally mounted manual control means connected to the opposite end of said lever, a cam rotatable with said shaft, an arm pivotally mounted concentrically with said manual control means and having cam follower means engageable with said cam, a rod slideably mounted in said arm, and a spring normally urging said rod to a position wherein the end of said rod forms a fulcrum for said lever intermediate the points of connection of said lever with said valve means and said manual control means, said fulcrum being movable in accordance with the rotation of said shaft by the engagement between said cam follower means and said cam.

2. In a tractor having means for the attachment of an agricultural implement, a hydraulic power unit, valve means for controlling the operation of said hydraulic power unit to raise and lower said attachment means with reference to the tractor, an actuating lever for moving said valve means between different operating positions, a manual control for said lever, spring means biasing said valve means, a draft responsive member, fulcrum means slideably carried by said draft responsive member and forming a movable fulcrum for said actuating lever, and a spring yieldably positioning said fulcrum means on said member, said spring being of such size as to overcome said valve biasing spring means.

3. In a tractor having means for the attachment of an agricultural implement, a hydraulic power unit, valve means for controlling the operation of said hydraulic power unit to raise and lower said attachment means with reference to the tractor, an actuating lever for moving said valve means between different operating positions, a manual control for said lever, spring means biasing said valve means, a height control member responsive to the raising and lowering of said attachment means, fulcrum means carried by said height control member and forming a movable fulcrum for said actuating lever, and a spring yieldably positioning said fulcrum means on said member, said spring being of such size as to overcome said valve biasing spring means.

4. In a tractor having means for the attachment of an agricultural implement, a hydraulic power unit, valve means for controlling the operation of said hydraulic power unit to raise and lower said attachment means with reference to the tractor, an actuating lever for moving said valve means between different operating positions, a manual control for said lever, spring means biasing said valve means, a draft responsive member, fulcrum means slideably carried by said draft responsive member and forming a movable fulcrum for said actuating lever, a spring yieldably positioning said fulcrum means on said member, a height control element responsive to the raising and lowering of said implement attachment means, fulcrum means slideably carried by said height control element and forming a second movable fulcrum for said actuating lever, and a spring yieldably positioning said last-named fulcrum means relative to said element, each of said springs having sufficient strength to overcome said valve biasing spring means.

5. In a tractor having means for the attachment of an implement, a hydraulic power unit, valve means for controlling the operation of said hydraulic power unit to raise and lower said attachment means and said implement, an actuating lever for moving said valve means between different operating positions, a manual control for said lever, spring means biasing said valve means, a draft responsive member, fulcrum means slideably carried by said draft responsive member and forming a movable fulcrum for said actuating lever, a height control member movable by the raising and lowering of said implement attachment means and carrying a second movable fulcrum for said actuating lever, said draft and height responsive members and their respective fulcrums being arranged so that for any intermediate position of said manual control said height control fulcrum normally forms the effective fulcrum for said actuating lever and said draft responsive fulcrum is ineffective, except that under conditions of materially increased draft said draft responsive fulcrum overrides said height responsive fulcrum and operates said valve means to raise said implement.

6. In a tractor having means for attaching an implement thereto, a hydraulic power implement lifting unit on said tractor, said lifting unit being adapted to raise said implement from a working position to a position above the ground line, valve means for controlling said hydraulic power unit, movable control means for said valve means, a manually operated member for moving said movable control means, height control means actuated by said lifting unit and forming a fulcrum for said movable control means to move the latter to a preselected position for each position of said manually operated member, movable draft responsive means adjacent said movable control means and forming a fulcrum for said movable control means under certain conditions, said draft responsive means being movable through a predetermined range when said implement is in working position and being so positioned relative to said movable control means by moving said movable control means away from said height control fulcrum when the draft on the implement increases beyond a predetermined amount to thereby cause said draft control means alone to control the position of said implement.

7. A tractor having means for attaching an agricultural implement thereto, a power actuated implement lifting unit associated with said tractor, said lifting unit being adapted to raise said implement from its normal working depth to well above the ground line, a movable actuating member arranged to control the actuation of said lifting unit, a manually operated member for selectively shifting the position of said movable actuating member, a height responsive member movable in response to the vertical movement of said implement and engaging said actuating member to shift the position of the latter, and a draft responsive member movable in response to changes in the draft upon the implement, said draft responsive member for any position of said manually operated member being normally free from operative engagement with said actuating member but being arranged to engage said actuating member and move the latter away from operative engagement with said height responsive member upon an abnormal increase in the draft applied to said implement to thereby cause said draft responsive member to control the position of said implement independently of said height responsive member.

8. A tractor having means for attaching an agricultural implement thereto, a power actuated implement lifting unit associated with said tractor, said lifting unit being adapted to raise said implement from its normal working depth to well above the ground line, an actuating lever arranged to control the actuation of said lifting unit, a manually operated member for selectively moving said actuating lever, a height responsive member movable in response to the vertical movement of said implement and directly contacting said actuating lever to normally shift the position of said lever and determine a predetermined implement height for each position of said manually operated member, and a draft responsive member movable in response to changes in the draft upon the implement, said draft responsive member for any position of said manually operated member being normally free from operative engagement with said actuating lever but being arranged to engage said actuating lever and move the latter away from operative engagement with said height responsive member upon an abnormal increase in the draft applied to said implement to thereby cause said draft responsive member to control the position of said implement independently of said height responsive member.

9. In a tractor having connections for an implement and a hydraulic power unit for varying the height of said implement, valve means for controlling the operation of said hydraulic power unit, an actuating member arranged to control said valve means, a manually operated member for moving said actuating member between different positions, a height responsive member movable in response to the movement of said implement and engaging said actuating member to determine a definite implement height for each position of said manually operated member, and a separate draft responsive member operatively connected to said implement and movable in response to implement draft and arranged to engage said actuating member to determine implement height in terms of implement draft and the position of the manually operated member, said draft responsive member under normal draft conditions being free from operative engagement with said actuating member so that implement height is normally determined by the position of the manually operated member and said height responsive member, said draft responsive member however being arranged to operatively engage said actuating member and override said height responsive member when the draft is materially increased above the normal draft for the particular operating depth for which the manually operated member is set to thereby cause said draft responsive member to control the position of said implement independently of said height responsive member.

10. In a tractor having means for attaching an implement thereto, a power actuated implement lifting unit on said tractor, said lifting unit being adapted to raise said implement from a working position to a position above the ground line, a movable actuating member arranged to control the actuation of said lifting unit, a height responsive member actuated by said lifting unit and engageable with said movable actuating member to move the latter to a predetermined position for each vertical position of the implement, a draft responsive member actuated by said implement moved thereby to a predetermined position for each value of draft upon the implement, said draft responsive member being so positioned relative to said movable actuating member that it is moved into operative engagement with said actuating member only when the draft on the implement exceeds a predetermined amount to thereupon move said actuating member away from operative engagement with said height responsive member and control the position of the implement by said draft responsive member alone.

11. In a tractor having means for attaching an implement thereto, a power actuated implement lifting unit on said tractor, said lifting unit being adapted to raise said implement from a working position to a position above the ground line, an actuating lever arranged to control the actuation of said lifting unit, a manually operated member for shifting the position of said actuating lever, a height responsive member actuated by said lifting unit and engageable with said actuating lever to move the latter to a position dependent upon the vertical position of the implement and the position of the manually operated member, a draft responsive member operatively connected to said implement and moved thereby to a predetermined position for each value of draft upon the implement, said draft responsive member being so positioned relative to said actuating lever that it is moved into operative engagement with said actuating lever only when the draft on the implement exceeds a predetermined amount to thereupon move said actuating lever away from operative engagement with said height responsive member and control the position of the implement by said draft responsive member alone.

EDWIN C. McRAE.

REFERENCES CITED

The following references are of record in the file of this patent:

UNITED STATES PATENTS

| Number | Name | Date |
|---|---|---|
| 689,186 | Heisler | Dec. 17, 1901 |
| 1,339,939 | Alter | May 11, 1920 |
| 1,511,318 | Berger | Oct. 14, 1924 |
| 2,293,906 | Kvavle et al. | Aug. 25, 1942 |
| 2,356,231 | Ferguson | Aug. 22, 1944 |
| 2,423,485 | Court | July 8, 1947 |
| 2,437,161 | Kane | Mar. 2, 1948 |